United States Patent
Jones et al.

(10) Patent No.: US 10,756,897 B2
(45) Date of Patent: Aug. 25, 2020

(54) DYNAMIC LICENSING FOR APPLICATIONS AND PLUGIN FRAMEWORK FOR VIRTUAL NETWORK SYSTEMS

(71) Applicant: Ciena Corporation, Hanover, MD (US)

(72) Inventors: Randy Jones, Nepean (CA); Phuong Van Nguyen, Ottawa (CA); Peter Ciolfi, Ottawa (CA); Kevin Andrew Meek, Stittsville (CA); Khenaidoo Nursimulu, Kanata (CA); Hesam Aldin Rahimi Koopayi, Ottawa (CA); Sen Wang, Ottawa (CA); Stéphane Luc Barbarie, Ottawa (CA)

(73) Assignee: Ciena Corporation, Hanover, MD (US)

( * ) Notice: Subject to any disclaimer, the term of this patent is extended or adjusted under 35 U.S.C. 154(b) by 38 days.

(21) Appl. No.: 15/861,742

(22) Filed: Jan. 4, 2018

(65) Prior Publication Data

US 2018/0131514 A1 May 10, 2018

Related U.S. Application Data

(63) Continuation of application No. 15/000,075, filed on Jan. 19, 2016, now Pat. No. 9,893,887.

(60) Provisional application No. 62/110,192, filed on Jan. 30, 2015.

(51) Int. Cl.
| | |
|---|---|
| *G06F 21/00* | (2013.01) |
| *H04L 9/14* | (2006.01) |
| *G06F 21/12* | (2013.01) |
| *G06F 21/62* | (2013.01) |
| *H04L 29/06* | (2006.01) |

(52) U.S. Cl.
CPC .............. *H04L 9/14* (2013.01); *G06F 21/121* (2013.01); *G06F 21/62* (2013.01); *H04L 63/123* (2013.01); *H04L 2209/24* (2013.01)

(58) Field of Classification Search
None
See application file for complete search history.

(56) References Cited

U.S. PATENT DOCUMENTS

| | | | |
|---|---|---|---|
| 5,708,709 | A | 1/1998 | Rose |
| 7,676,437 | B2 | 3/2010 | Satkunanathan et al. |
| 8,316,237 | B1 | 11/2012 | Felsher et al. |

(Continued)

FOREIGN PATENT DOCUMENTS

| | | | | |
|---|---|---|---|---|
| WO | WO-2014160479 A1 | * | 10/2014 | ............ H04L 47/70 |
| WO | 2015116449 A1 | | 8/2015 | |

OTHER PUBLICATIONS

Jun. 22, 2016 European Search Report issued for European Patent Application EP 16 15 3600.

*Primary Examiner* — Maung T Lwin
(74) *Attorney, Agent, or Firm* — Clements Bernard Walker; Lawrence A. Baratta, Jr.; Christopher L. Bernard

(57) ABSTRACT

A Network Functions Virtualization (NFV) method integrating third-party Virtual Network Functions (VNF) through a plugin framework includes operating, via one or more servers in an NFV cloud, the plugin framework with Application Programming Interfaces (API) to one or more third-party VNFs; providing a catalog of VNF services comprising the one or more third-party VNFs to an end user; and operating the one or more third-party VNFs with the end user via the NFV cloud, wherein the one or more third-party VNFs are from a different vendor than an operator of the NFV cloud.

20 Claims, 13 Drawing Sheets

(56) References Cited

U.S. PATENT DOCUMENTS

| | | |
|---|---|---|
| 8,386,773 B2 | 2/2013 | Sherkin et al. |
| 8,763,159 B1 | 6/2014 | Kobets et al. |
| 8,850,602 B2 | 9/2014 | Lee et al. |
| 9,742,690 B2* | 8/2017 | Parikh .................. H04L 47/762 |
| 2003/0014652 A1 | 1/2003 | Nakayama |
| 2004/0267946 A1 | 12/2004 | Caplin et al. |
| 2005/0289072 A1 | 12/2005 | Sabharwal |
| 2006/0277598 A1 | 12/2006 | Ahn et al. |
| 2008/0313743 A1 | 12/2008 | Chan et al. |
| 2009/0254971 A1 | 10/2009 | Herz et al. |
| 2009/0326964 A1 | 12/2009 | Garg et al. |
| 2009/0327737 A1 | 12/2009 | Hsu et al. |
| 2010/0223471 A1 | 9/2010 | Fresko et al. |
| 2011/0184993 A1* | 7/2011 | Chawla ............... G06F 9/45533 707/802 |
| 2012/0136849 A1 | 5/2012 | Niranjan et al. |
| 2012/0284507 A1 | 11/2012 | Bostanci et al. |
| 2012/0311720 A1 | 12/2012 | Lee et al. |
| 2013/0167147 A1* | 6/2013 | Corrie ................. G06F 9/45558 718/1 |
| 2014/0089922 A1 | 3/2014 | Lang et al. |
| 2014/0282821 A1 | 9/2014 | Adler et al. |
| 2014/0317261 A1* | 10/2014 | Shatzkamer ............ G06F 9/455 709/223 |
| 2014/0380031 A1 | 12/2014 | Jones et al. |
| 2015/0063166 A1 | 3/2015 | Sif et al. |
| 2015/0120900 A1* | 4/2015 | Sahoo ................. G06F 21/6227 709/223 |
| 2015/0180730 A1* | 6/2015 | Felstaine ............. H04L 41/022 709/225 |
| 2015/0295750 A1* | 10/2015 | Blanco ................. G06F 11/181 714/4.2 |
| 2016/0057209 A1* | 2/2016 | Parikh .................... H04L 67/10 709/203 |
| 2016/0119293 A1 | 4/2016 | Leon et al. |
| 2016/0127514 A1* | 5/2016 | Maksumov ............ H04L 69/08 709/202 |
| 2016/0234224 A1* | 8/2016 | Ashley ................... H04L 63/20 |

* cited by examiner

```
import org.osgi.framework.BundleContext;
import org.osgi.framework.ServiceRegistration;
import com.ciena.matrix.plugin.api.VnfLcmService;

public class PluginExamples implements BundleActivator {

// allocate a variable to store the registered service
    ServiceRegistration defaultPartnerServiceRegistration;

/*
     * Example showing how to register the VNF Life Cycle Manager service.
     * Service registration is typically performed within the "start" method of
     * class implementing the BundleActivator interface
     */
    public void start(BundleContext context) throws Exception {

// Instantiate the plugin's implementation of the VNF Life Cycle Manager Service
        VnfLcmService lcmService = new VnfLcmServiceImpl();

// Register the service. Note that class.getName() will return the fully
        // qualified package.class name which by convention becomes pluginId.serviceName
        // within the Matrix plugin framework.
        defaultPartnerServiceRegistration = context.registerService(VnfLcmServiceImpl.class.getName(),
                                                                    lcmService,
                                                                    null);

```
import org.osgi.framework.BundleContext;
import org.osgi.framework.ServiceReference;

import com.ciena.matrix.plugin.api.*;

public class PluginExamples {

// variables to store Ciena producer services
    private CommunicationService comService;
    private DataAccessService dataAccessService;
    private LicenseManagementService licenseMgrService;

// The main Ciena Matrix plugin ID
    String mainPluginId = "com.ciena.matrix.plugin";

// The Matrix communications service producer name
    String comServiceId = "CommunicationServiceImpl";

// The Matrix data access service producer name
    String dataServiceId = "DataAccessServiceImpl";

// The Matrix license manager service producer name
    String licenseMgrId = "LicenseManagementServiceImpl";

public void myServiceLookup (BundleContext context) throws Exception {

ServiceReference sr;
        // lookup each of the producer services by concatenating the plugin Id with service name
        sr = context.getServiceReference(mainPluginId + "." + comServiceId);
        if (sr != null) comService = (CommunicationService) context.getService(sr);

sr = context.getServiceReference(mainPluginId + "." + dataServiceId);
        if (sr != null) dataAccessService = (DataAccessService) context.getService(sr);

sr = context.getServiceReference(mainPluginId + "." + licenseMgrId);
        if (sr != null) licenseMgrService = (LicenseManagementService) context.getService(sr);

{
            // write some code to use the services....

DYNAMIC LICENSING FOR APPLICATIONS AND PLUGIN FRAMEWORK FOR VIRTUAL NETWORK SYSTEMS

CROSS-REFERENCE TO RELATED APPLICATION(S)

The present patent/application is a continuation of U.S. patent application Ser. No. 15/000,075, filed on Jan. 19, 2016, and entitled "DYNAMIC LICENSING FOR APPLICATIONS AND PLUGIN FRAMEWORK FOR VIRTUAL NETWORK SYSTEMS," which claims priority to U.S. Provisional Patent Application No. 62/110,192, filed on Jan. 30, 2015, and entitled "DYNAMIC LICENSING FOR APPLICATIONS AND PLUGIN FRAMEWORK FOR VIRTUAL NETWORK SYSTEMS," the contents of each are incorporated by reference herein.

FIELD OF THE DISCLOSURE

The present disclosure relates generally to computer and networking systems and methods. More particularly, the present disclosure relates to dynamic licensing for applications and a plugin framework for virtual network systems such as Network Functions Virtualization (NFV) and the like.

BACKGROUND OF THE DISCLOSURE

Networks are evolving towards virtualization much like server platforms have. Network Functions Virtualization (NFV) is a network architecture concept that proposes using Information Technology (IT) virtualization related technologies to virtualize entire classes of network node functions into building blocks that may be connected, or chained, to create communication services. A virtualized network function, or VNF, may include one or more virtual machines running different software and processes, on top of industry standard high volume servers, switches and storage, or even cloud computing infrastructure, instead of having proprietary hardware appliances for each network function. Example VNFs can include access routers, firewalls, Layer 2/3 encryption, Wide Area Network (WAN) optimization, and the like.

There are many challenges involved in deploying and operating a cloud-based NFV platform. Virtualization and dynamic "on-demand" services create new challenges for traditional use of license keys to enforce entitlement. For example, in NFV or other virtual systems, virtualization makes it easy to "copy, distribute and run" valuable assets, VNFs have a transient lifecycle, not typically locked to a physical host, and having keys available at the right time and place drives administrative costs for a global distributed cloud system, such as a NFV infrastructure.

Also, with respect to NFV, vendors providing NFV systems will have relationships with partners who ultimately need to integrate with a vendor NFV platform. Conventionally, VNF vendors have been selling their VNF products directly to service providers or end users. There is a need for third-party integration and bundling of VNF products together to reduce operational expenses, engineering expenses, service definition and fulfillment time and the like. It would be advantageous to have a pluggable framework for a cloud-based NFV system that allowed integration of VNF products to provide a diverse catalog of VNF services in an integrated manner.

BRIEF SUMMARY OF THE DISCLOSURE

In an embodiment, a dynamic licensing method is described, implemented in an operating environment including one or more third-party applications, an integrated system offering and enabling execution of the one or more third-party applications, and one or more end users operating the one or more third-party applications through the integrated system. The dynamic licensing method includes, responsive to an end user requesting a third-party application through the integrated system, determining a license key, for the third-party application, in the integrated system using a public key associated with the integrated system; receiving an encrypted validation result from a system associated with the third-party application that validates the license key using a private key and software provided by the integrated system, wherein the system returns the encrypted validation results to the third-party application which provides the encrypted validation results to the integrated system; and decrypting the encrypted validation results using previously allocated session keys and determining whether to run the third-party application based on the validation results. The system can offer the one or more third-party applications through a plugin framework adapted to auto license and auto configure the one or more third-party applications from different vendors.

The dynamic licensing method can further include executing the third-party application via the integrated system based on the validation results. The dynamic licensing method can further include determining fraudulent use of the third-party application via the integrated system based on the validation results. The one or more third-party applications can include Virtual Network Functions (VNF) that are executed by the integrated system as a cloud-based system. The one or more third-party applications can include Virtual Network Functions (VNF) that are not locked to a physical host. The integrated system can be adapted to generate dynamically the license key on-demand rather than obtaining the license key from the system associated with the third-party application. The one or more third-party applications can include at least two applications from different vendors, offered through the integrated system via a plugin framework. The integrated system can include a multi-domain orchestrator.

In another embodiment, an integrated system is described adapted to operate in an environment including one or more third-party applications, the integrated system offering and enabling execution of the one or more third-party applications, and one or more end users operating the one or more third-party applications through the integrated system. The integrated system can include a network interface communicatively coupled to the one or more end users; a processor communicatively coupled to the network interface; and memory storing instructions that, when executed, cause the processor to, responsive to an end user requesting a third-party application through the integrated system, determine a license key, for the third-party application, using a public key associated with the integrated system, receive an encrypted validation result from a system associated with the third-party application that validates the license key using a private key and software provided by the integrated system, wherein the system returns the encrypted validation results to the third-party application which provides the encrypted validation results to the integrated system, and decrypt the encrypted validation results using previously allocated session keys to determine whether to run the third-party application based on the validation results.

The integrated system can offer the one or more third-party applications through a plugin framework adapted to auto license and auto configure the one or more third-party applications from different vendors. The memory storing instructions that, when executed, can further cause the processor to execute the third-party application via the integrated system based on the validation results. The memory storing instructions that, when executed, can further cause the processor to determine fraudulent use of the third-party application via the integrated system based on the validation results. The one or more third-party applications can include Virtual Network Functions (VNF) that are executed by the integrated system as a cloud-based system. The one or more third-party applications can include Virtual Network Functions (VNF) that are not locked to a physical host. The integrated system can be adapted to generate dynamically the license key on-demand rather than obtaining the license key from the system associated with the third-party application. The one or more third-party applications can include at least two applications from different vendors, offered through the integrated system via a plugin framework. The integrated system can include a multi-domain orchestrator.

In a further embodiment, an operating environment for one or more end users to operate one or more third-party applications includes an integrated system adapted to offer and enable execution of the one or more third-party applications; and a system adapted to provide the one or more third-party applications to the integrated system, wherein responsive to an end user request for a third-party application through the integrated system, the integrated system is adapted to determine a license key, for the third-party application, using a public key associated with the integrated system, receive an encrypted validation result from the system associated with the third-party application that validates the license key using a private key and software provided by the integrated system, wherein the system returns the encrypted validation results to the third-party application which provides the encrypted validation results to the integrated system, and decrypt the encrypted validation results using previously allocated session keys to determine whether to run the third-party application based on the validation results. The one or more third-party applications can include Virtual Network Functions (VNF) that are not locked to a physical host.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 7 and 8 are listings of code for an example service registration and lookup respectively;

DETAILED DESCRIPTION OF THE DISCLOSURE

Figure 1:
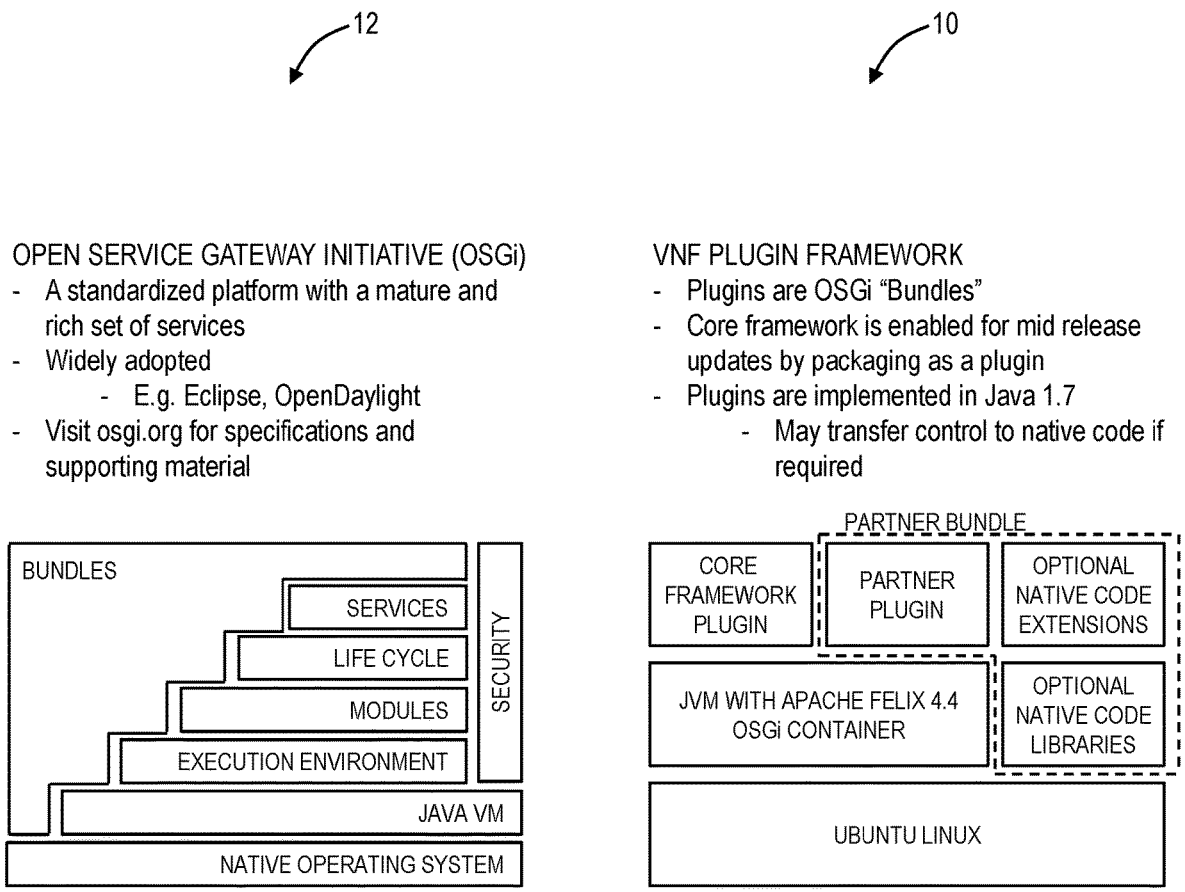
FIG. 1 is a block diagram of a modular plugin framework architecture.

In various embodiments, the present disclosure relates to dynamic licensing for applications and a plugin framework for virtual network systems such as Network Functions Virtualization (NFV) and the like. The foregoing describes the dynamic licensing for applications and the plugin framework in the context of NFV. Those of ordinary skill in the art will recognize the dynamic licensing for applications contemplates operation in any distributed environment.

A dynamic licensing method, implemented in an integrated system, includes responsive to an end user requesting a third-party application through the integrated system, determining a license key, for the third-party application, in the integrated system using a public key associated with the integrated system; receiving an encrypted validation result from a system associated with the third-party application that validates the license key using a private key and software provided with the integrated system, wherein the system returns the encrypted validation results to the third-party application which provides the encrypted validation results to the integrated system; and decrypting the encrypted validation results using previously allocated session key and determining whether to run the third-party application based on the validation results.

A Network Functions Virtualization (NFV) system configured to integrate third-party Virtual Network Functions (VNF) through a plugin framework, includes one or more servers configured to operate a plugin framework with Application Programming Interfaces (API) to one or more third-party VNFs; wherein the NFV system is an integrated system to end users providing a catalog of VNF services based on the one or more third-party VNFs included therein; and wherein the plugin framework manages service mediation between the NFV system and the one or more third-party VNFs and element interfaces for management of the one or more third-party VNFs.

The dynamic licensing for applications has the following requirements—prevent running a new VNF (or any other Virtual Function (VF) or application) instance outside a cloud system environment; prevent running an existing snapshot (of a VNF, VF, or application) outside the cloud system environment; enable partner runtime code to detect and block unauthorized use; address the scaling costs associated with managed block license key administration within an agile on-demand service fulfillment model; and provide revenue assurance through a combination of usage auditing and postpaid charging.

The plugin framework for virtual network systems enables third-party integration of VNF functions into an NFV cloud system. Integration typically involves the following activities: development of a plugin to extend the NFV cloud system to control and manage a specific make/model of VNF; providing VNF package information sufficient for the vendor to onboard a VNF into the NFV cloud system; and updating a VNF to conform to the NFV cloud system license entitlement controls.

In the foregoing description, the following terms, acronyms, and/or abbreviations are used:

| Term | Meaning |
| --- | --- |
| Cooperative Development Agreement (CDA) | Integration of a VNF into a NFV cloud system may be governed by a CDA between the vendor and a VNF Partner. |
| Element | Within this document, the term "element" is most commonly used to refer to an external system that a plugin may communicate with. For example, instances of VNFs and instances of EMSs are each example of "elements". |
| Element Management System (EMS) | An EMS performs management functions for one or more elements. These functions are most often in support of fault, configuration, accounting, performance, and/or security management. (FCAPS). |
| Network Functions Virtualization (NFV) | NFV is the principle of separating network functions from the hardware they run on by using virtual hardware abstraction. |
| Network Functions Virtualization Orchestrator (NFVO) | The NFVO is a function that deploys, operates, manages, and coordinates VNFs. |
| Statement of Work (SoW) | Over the term of a CDA one or more SoWs may be created to define the work necessary to integrate one or more VNFs into the NFV cloud system. |
| Virtual Network Function Manager (VNFM) | The VNF Manager is responsible for the lifecycle management of VNF instances. |
| VNF Catalog | A set of VNF packages. The VNF Market has a master catalog, and each director has a VNF catalog, which is a subset of the master catalog. |
| Virtual Network Function (VNF) | A network function built for a deployment on a virtual network function infrastructure. |
| VNF Instance | A run-time instantiation of the VNF software, resulting from completing the instantiation of its VNFs and the connectivity between them, using the VNF deployment and operational information captured in the VNF, as well as additional run-time instance-specific information and constraints. |
| VNF Package | The combination of a VNF and its associated metadata. |
| VNF Plugin | A bundle of executable software automating configuration and management tasks for a VNF instance. |
| NFV cloud system | An NFV solution, including all associated hardware and software. |
| Director | The Director is the orchestration and management portion of the NFV cloud system. The Director can be referred to as a "NFV OS (Operating System)" or "NFV platform". |
| VNF Market | The VNF Market contains the master catalog of VNFs distributed by the NFV cloud system. |

Plugin Framework Architecture

Referring to FIG. 1, in an embodiment, a block diagram illustrates a modular plugin framework 10 architecture. The plugin framework 10, for the NFV cloud system, can be based on the Open Service Gateway Initiative (OSGi) modular framework 12 shown. Plugins can be implemented and packaged as OSGi bundles which run atop the Apache Felix OSGi container. By definition, OSGi runs within a Java Virtual Machine (JVM), and plugins use Java to integrate with the plugin framework. However, large parts of plugins can be implemented using languages other than Java, if desired.

Figure 2:
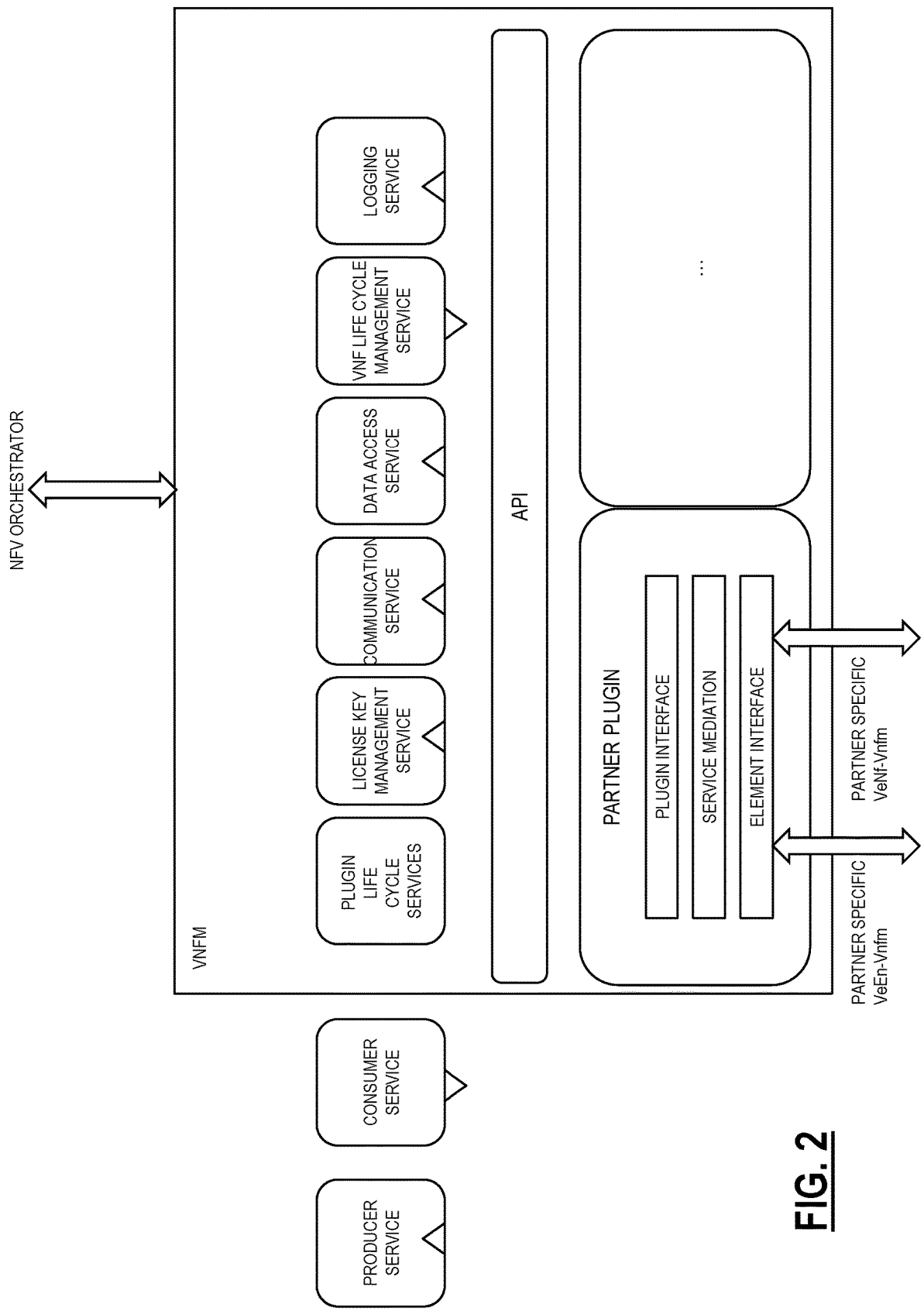
FIG. 2 is a block diagram of a functional structure of the modular plugin framework.

Referring to FIG. 2, in an embodiment, a block diagram illustrates a functional structure of the modular plugin framework 10. The modular plugin framework 10 can be contained within the VNF Manager (VNFM) server of the Director.

The modular plugin framework 10 defines the set of services available to plugins to integrate into the Director runtime environment. Plugins access services via interfaces defined by an Application Programming Interface (API) layer. The API layer is exported by the plugin framework and imported by all plugins.

Each Partner Plugin provides the following general functions:

Plugin Interface: interfaces interacting with the API,

Service Mediation: performs all business logic, data transformation and/or state management for VNFs, and Element Interface: provides interfaces for management of VNFs using Partner specific protocols and management models.

As a minimum, the Plugin Interface layer must be implemented in Java. Service Mediation and Element interface layers may be implemented using other languages as long as the plugin bundle includes all required libraries. The plugin framework 10 makes no assumption about the protocols or information models used to interact with a VNF. Plugin developers can decide upon the interfaces used to manage and control a VNF and are free to access a VNF directly and/or via an Element Management System (EMS).

A single plugin can manage an arbitrary number of VNF models and instances. Each VNF make/model is associated to a single plugin based upon the value of the pluginID field of the VNF package. A VNF Market onboarding process allocates a unique pluginID to each certified plugin and binds it to a package. Details of plugin naming are described herein.

Services

Figure 3:
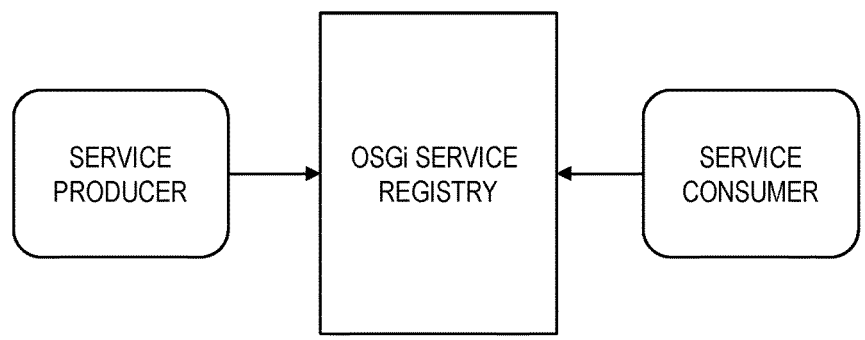
FIGS. 3 and 4 are block diagrams of a general Producer/Consumer service model.
Figure 4:
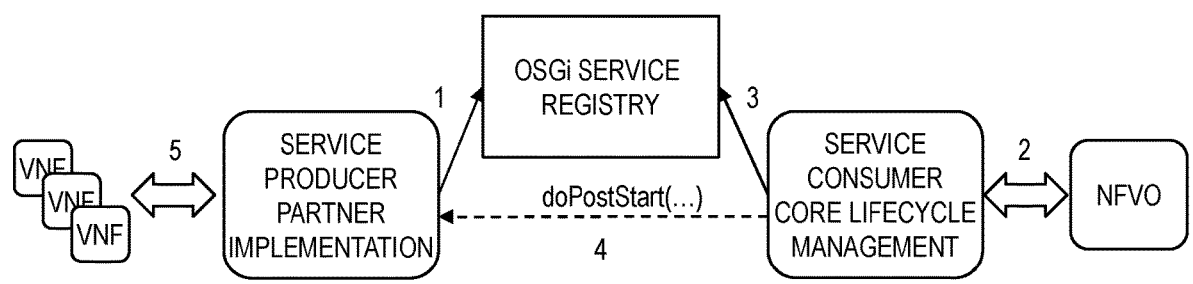

Referring to FIGS. 3 and 4, in an embodiment, a block diagram illustrates a general Producer/Consumer service model. All services are registered with the OSGi container service registry and interact using a Consumer/Producer design pattern. The general Producer/Consumer service model is shown in FIG. 3. A consumer service typically calls interfaces implemented by producer services after first looking up the producer service in the service registry.

A more specific example of the Producer/Consumer relationship is illustrated in FIG. 4. This example shows the interactions occurring as part of the orchestration of a VNF. The steps are as follows:

1. At plugin activation time all services are registered with the OSGi Service Registry. This is done in the "start" method of the plugin class implementing the org.osgi.framework.BundleActivator interface.

2. NFV orchestration notifies the Core Lifecycle Management consumer service that a VNF has been deployed and started.

3. Given the plugin id of the VNF package, the consumer service uses the OSGi Service Registry to look up the Lifecycle Management producer service of the plugin associated with the VNF package.

4. The Core plugin Lifecycle Management consumer service invokes the "doPostStart( )" method of the class implementing the VnfLcmInterface interface of the producer service.

5. The Service Producer performs any and all accesses to the VNF instance that has just started. Not shown in FIG. 4, the Service Producer is free to call other producer services to get information prior to accessing the VNF instance.

Services are summarized in Table 2.

TABLE 2

| Service | Core Framework Producer? | Service Name | Description |
| --- | --- | --- | --- |
| Plugin Life Cycle Services | No | N/A | Manages the installation and activation of plugins. Each plugin must implement org.osgi.framework.BundleActivator interface to register services it implements with the OSGi Service Registry. The core framework plugin implements and registers most services as "Producer" services. |
| License Key Management Services | Yes | LicenseManagementServiceImpl | Provides services for licenses key allocation/de-allocation. |
| Communication Services | Yes | CommunicationServiceImpl | Provides services for connectivity to instances of VNFs. |
| Data Access Services | Yes | DataAccessServiceImpl | Provides services for persistent high availability storage of plugin state data. |
| VNF Life Cycle Management Services | No | VnfLcmServiceImpl | Provides services for managing VNF instance life cycle. Partner plugins implement this service as a "Producer" service. The core plugin on behalf of service orchestration calls the interfaces provided by the VNF Life Cycle Management Service for a given Partner plugin. For example, the core plugin calls "doPreStart" and "doPostStart" interfaces following deployment and before and after VM startup respectively. |
| Logging Service | Yes | | The Logging Service uses facilities of the OSGi framework. Provides a service based upon Log4j for plugins to log messages into the consolidated set of log files for the Director. |

Concurrency

Plugins execute within a multi-threaded environment. Threads are allocated and managed by the OSGi container and supporting Java libraries. A thread is allocated to each request initiated by a Director application (e.g. NFV Orchestration). Threads generally execute in a synchronous "run to completion" fashion. Where a plugin has long duration exchanges with external elements, it is at the discretion of the plugin developer to decide whether to block a thread or implement their own asynchronous transaction tracking.

When a plugin shares internal state between threads, the plugin is responsible for implementing appropriate locking mechanisms to guarantee thread safety. Plugins can assume thread safety for all producer services provided by the plugin framework. Where a plugin requires background threads, the plugin is responsible for creating and managing threads within a High Availability (HA) environment.

High Availability

Figure 5:
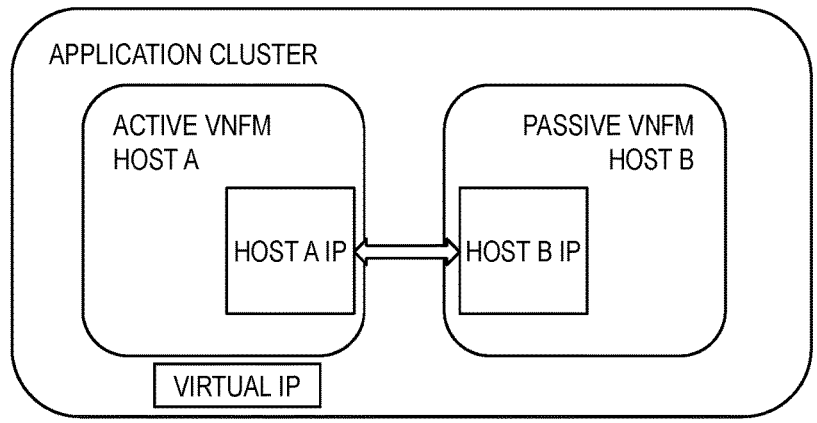
FIG. 5 is a block diagram of a model for high availability within the Virtual Network Function Manager (VNFM)

Referring to FIG. 5, in an embodiment, a block diagram illustrates a model for high availability within the VNFM. The plugin framework is contained within each VFNM server instance. Plugins must implement the "start" and "stop" methods of the org.osgi.framework.BundleActivator interfaces to support high availability. Plugins on the Active VNFM of a HA cluster are "started" by the plugin framework via the org.osgi.framework.BundleActivator.start method. Plugins on the Passive VNFM of a HA cluster are "stopped" by the plugin framework via their implementation of the org.osgi.framework.BundleActivator.stop method.

The Director HA infrastructure will ensure that all plugin data persisted using the DataAccessInterface of the plugin framework API is propagated to the Passive VNFM within a cluster. All other plugin state data is not propagated from active to passive VNFM by the plugin framework.

Plugin Development

Figure 6:
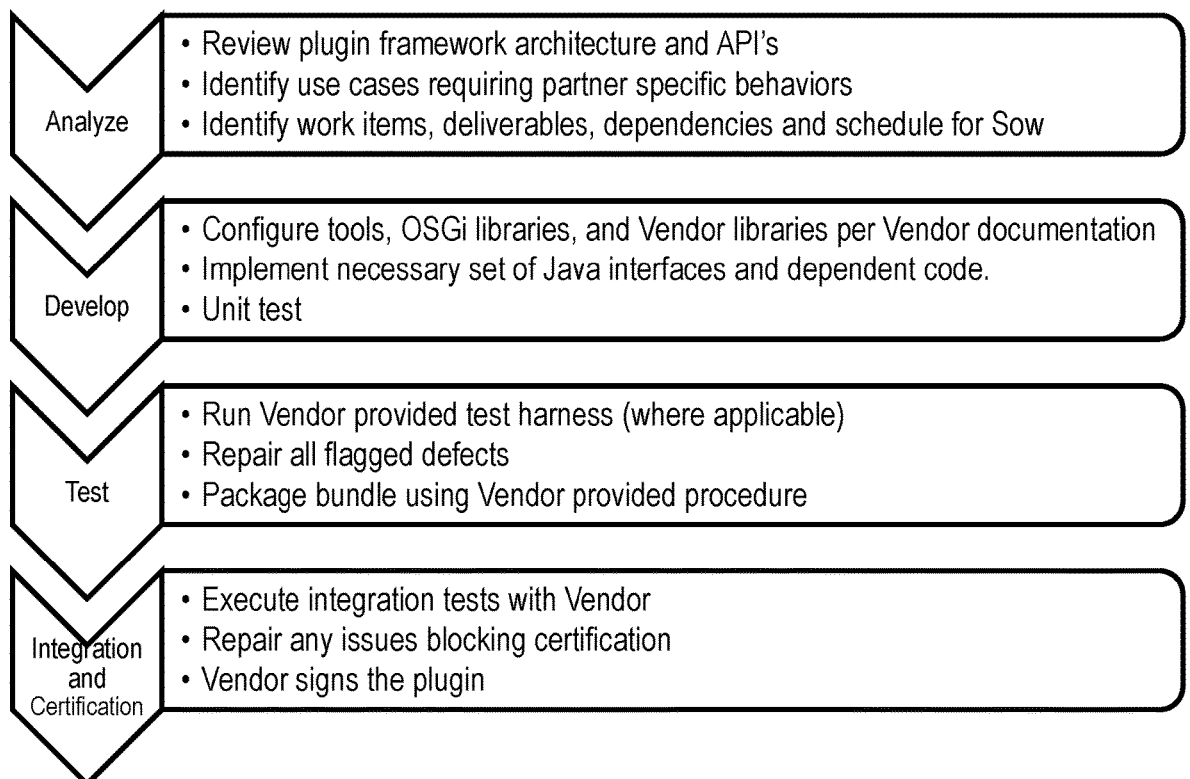
FIG. 6 is a flow chart of activities performed to develop a plugin.

Referring to FIG. 6, in an embodiment, a flow chart illustrates activities performed to develop a plugin. The vendor supports its partners and can help with many of these activities either directly or indirectly by providing access to useful resources and documentation.

A generalized service name format can be defined to enable consistent service registration and lookup. The general format is <pluginID>.<serviceName>

Where, pluginID: is a unique string assigned by the vendor. Unsigned 3rd party (e.g. Operator developed) plugins may be developed which must avoid overlap of vendor administered plugin IDs. Such plugins must include the literal string "private" as the suffix to their pluginID. For example "com.acme.plugin.private"; and serviceName: as summarized in Table 2 above.

Service Registration and Lookup

Referring to FIGS. 7 and 8, in an embodiment, code is shown for an example service registration. Each plugin must register service producers it provides to consumers within the OSGi service registry. The example in FIG. 7 shows a plugin registering its implementation of Vnf life cycle manager service. In this example, the code registers an implementation of the VnfLcmService called com.ciena.matrix.plugin.VnfLcmServiceImpl.

The example in FIG. 8 shows a plugin looking up producer services provided with the core plugin. Note that the plugin ID for the main Ciena plugin is com.ciena.matrix.plugin and each service name from Table 2 is merged to form the service name to lookup.

Use Cases—Setup Cloud-Init Data

Figure 9:
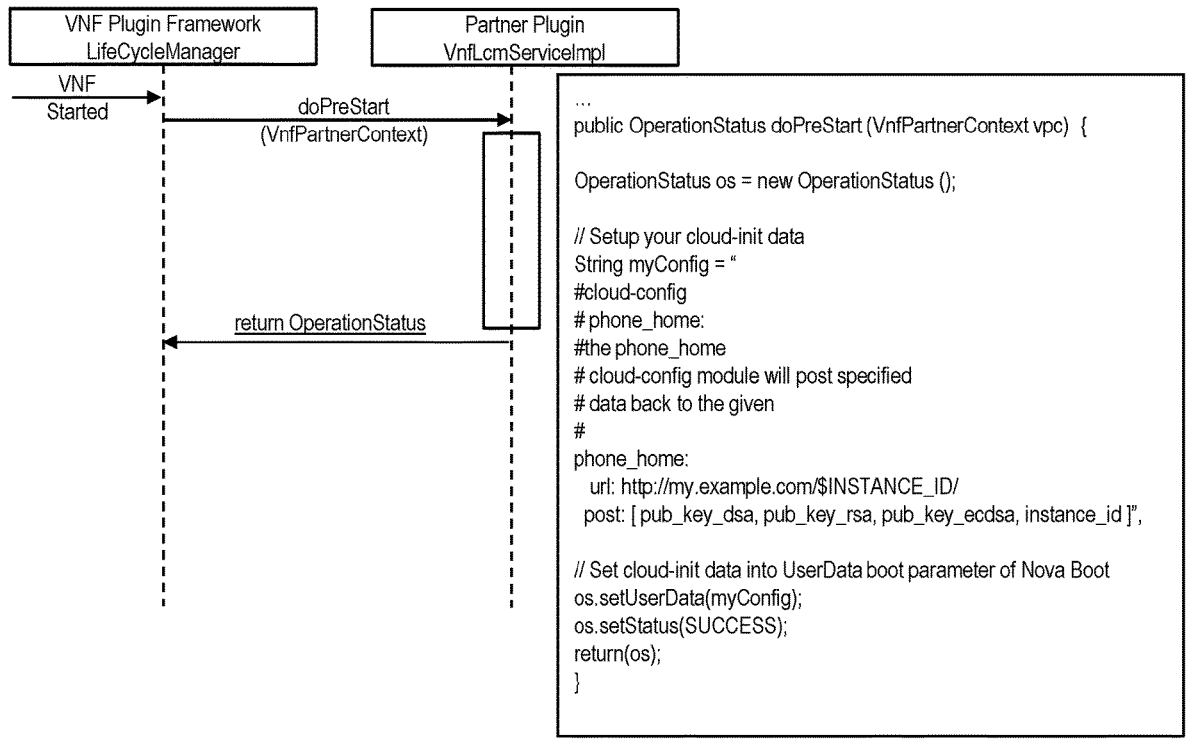
FIG. 9 is a flow diagram of a sequence of using a plugin to setup cloud-init data.

Referring to FIG. 9, in an embodiment, a flow diagram illustrates a sequence of using a plugin to setup cloud-init data. Cloud-init (see cloudinit.readthedocs.org/en/latest/) is a popular and well-supported service used to initialize Linux systems within cloud environments. The VNF life cycle manager uses the -user-data argument of the OpenStack nova boot (see docs.openstack.org/cli-reference/content/novaclient_commands.html#novaclient_subcommand_boot) command to pass cloud-init data to a VNF.

The sequence in FIG. 9 shows how a plugin sets up cloud-init data to be passed to a VNF. In this sequence, the plugin's implementation of the VnfLcmService.doPreStart method sets the cloud-init data into the OperationStatus passed back to a LifeCycleManager. The LifeCycleManager co-ordinates populating the data into the nova boot command for the VM running the VNF. The cloud-init information shown in FIG. 9 is provided as a simple example. The cloud-init mechanism is very flexible with many options for system initialization. As an alternative example, a plugin could bundle a text file containing a static configuration for a VNF, which the plugin could open and pass the contents to a VM as an argument to the nova boot—user-data option.

Dynamic License Key Creation and Validation

Figure 10:
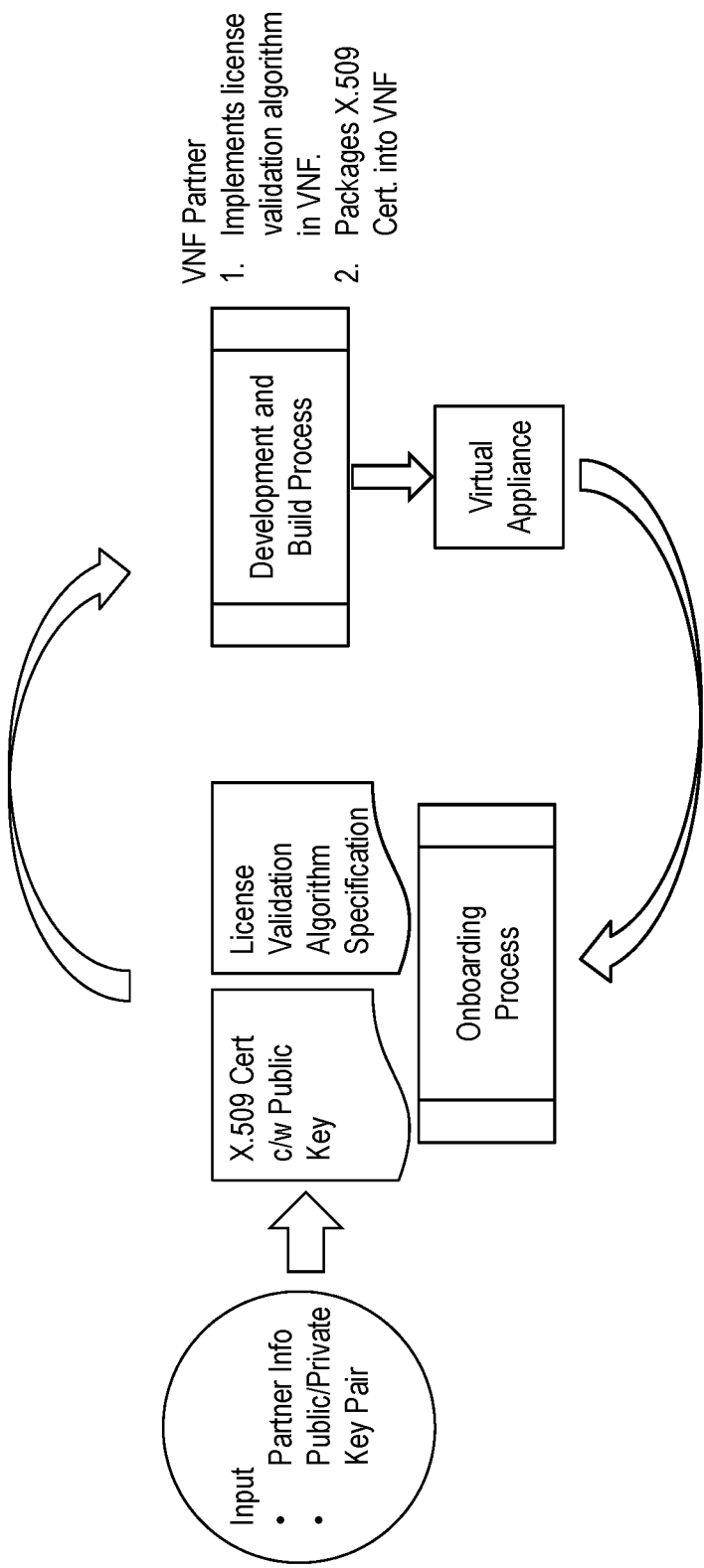
FIGS. 10 and 11 are flow charts of pre-requisite steps for dynamic licensing.
Figure 11:
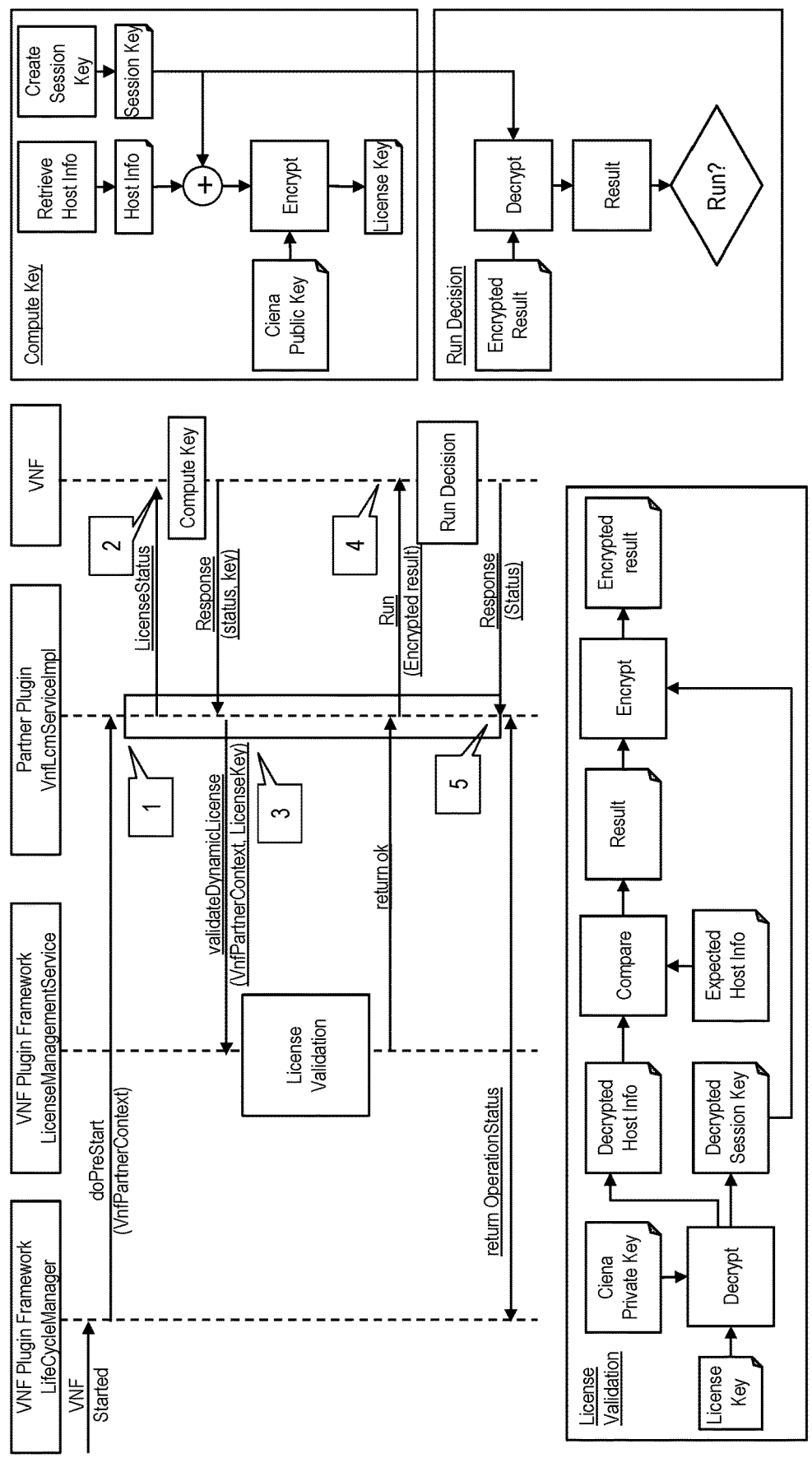

Referring to FIGS. 10 and 11, in an embodiment, flow charts illustrate pre-requisite steps for dynamic licensing. Virtualization and dynamic "on-demand" services create new challenges for traditional use of license keys to enforce entitlement. For example:

Virtualization makes it easy to "copy, distribute and run" valuable assets,

VNFs have a transient lifecycle, not typically locked to a physical host, and

Having keys availability in the right time and place drives administrative costs for a global distributed NFVI.

In response to these new challenges, the present disclosure provides a dynamic license key generation and validation scheme conforming to the following requirements:

Prevent running a new VNF instance outside a vendor's environment;

Prevent running an existing VNF snapshot outside a vendor's environment;

Enable partner runtime code to detect and block unauthorized use;

Address the scaling costs associated with Managed Block license key administration within an agile on-demand service fulfillment model; and Provide revenue assurance through a combination of usage auditing and postpaid charging.

Under the dynamic license key creation and validation scheme, the vendor shares a Public/Private key pair with partners during onboarding as shown in FIG. 10. Partners implement an algorithm according to the vendor's specifications within both their plugin and VNF prior to final certification test and onboarding. Again, the dynamic licensing is described with reference to integrating VNF products into a NFV cloud system, but this process could equally be used in any software application delivery system, such as the app store from Apple, Google Play from Google, and the like.

The sub-process labeled "Development and Build Process" in FIG. 10 includes the plugin and VNF development work needed to realize the sequence shown in FIG. 11.

Numbered call outs shown in FIG. 11 refer to the processing sequence below.

1) The sequence begins when the plugin framework calls the "doPostStart( )" method of a plugin's implementation of the VnfLcmService. This call indicates a VM hosting the VNF is starting, and it is time to compute and validate a key prior to running the VNFs application.

2) The plugin requests the VNF to compute a "License Key" using a partner specific message (shown as "LicenseStatus" in FIG. 11). In response, the VNF computes a "License Key" following the steps shown in the "Compute Key" block of FIG. 11. More specifically, a "Session Key" is allocated and combined with "Host Info" and encrypted using the Ciena provided Public Key to form the "License Key". The "License Key" is returned to the plugin by the VNF. Note that "Host Info" is specific to a deployed instance of a VNF and is the shared information known to both the VNF and the Director.

3) The plugin looks up a LicenseManagementService and calls the validateDynamicLicense method to validate the "License Key." The LicenseManagement Service will validate the License Key according to the flow shown in the "License Validation" block of FIG. 11. It then encrypts the result of validation and returns this value to the calling plugin.

4) The plugin passes the encrypted result to the VNF using a partner specific message (shown as a "Run" message in FIG. 11). Using the processing sequence shown in the "Run Decision" block of FIG. 11 the VNF decrypts the license key validation result using the previously allocated session key and makes the decision to run based on the run result.

5) The VNF responds with the status of its run decision which the plugin returns to the LifeCycleManager service of the plugin framework.

Dynamic Licensing Process

Figure 12:
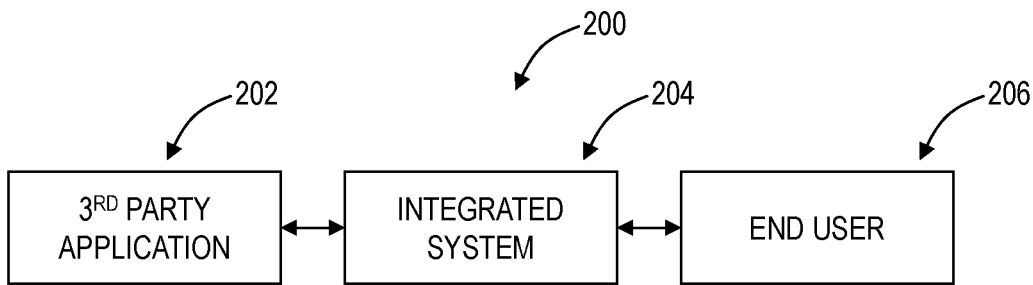
FIG. 12 is a block diagram of an operating environment for using a dynamic licensing process.

Referring to FIG. 12, in an embodiment, a block diagram illustrates an operating environment 200 for using a dynamic licensing process. The operating environment 200 includes one or more third-party applications 202; an integrated system 204 in which the third-party applications 202 are offered, used, etc.; and one or more end users 206 use the one or more third-party applications 202 through the integrated system 204. Also, the integrated system 204, while a single system, can be operated by a service provider and provided by a vendor. The operating environment 200 applies to the VNF functionality described herein, but can also apply to any software delivery system—cloud-bases, Software-as-a-Service, etc. For the VNF functionality, the third-party applications 202 can be individual VNF products, the integrated system 204 can be the cloud NFV system, and the end users 206 can be using the individual VNF products. In another embodiment, the third-party applications 202 can be any software applications, the integrated system 204 can be the app store, Google Play, etc., and the end users 206 can be using the software applications. Any other similar structure is contemplated. The goal of the dynamic licensing process is to compensate properly owners of the one or more third-party applications 202 for use by the end users 206.

Figure 13:
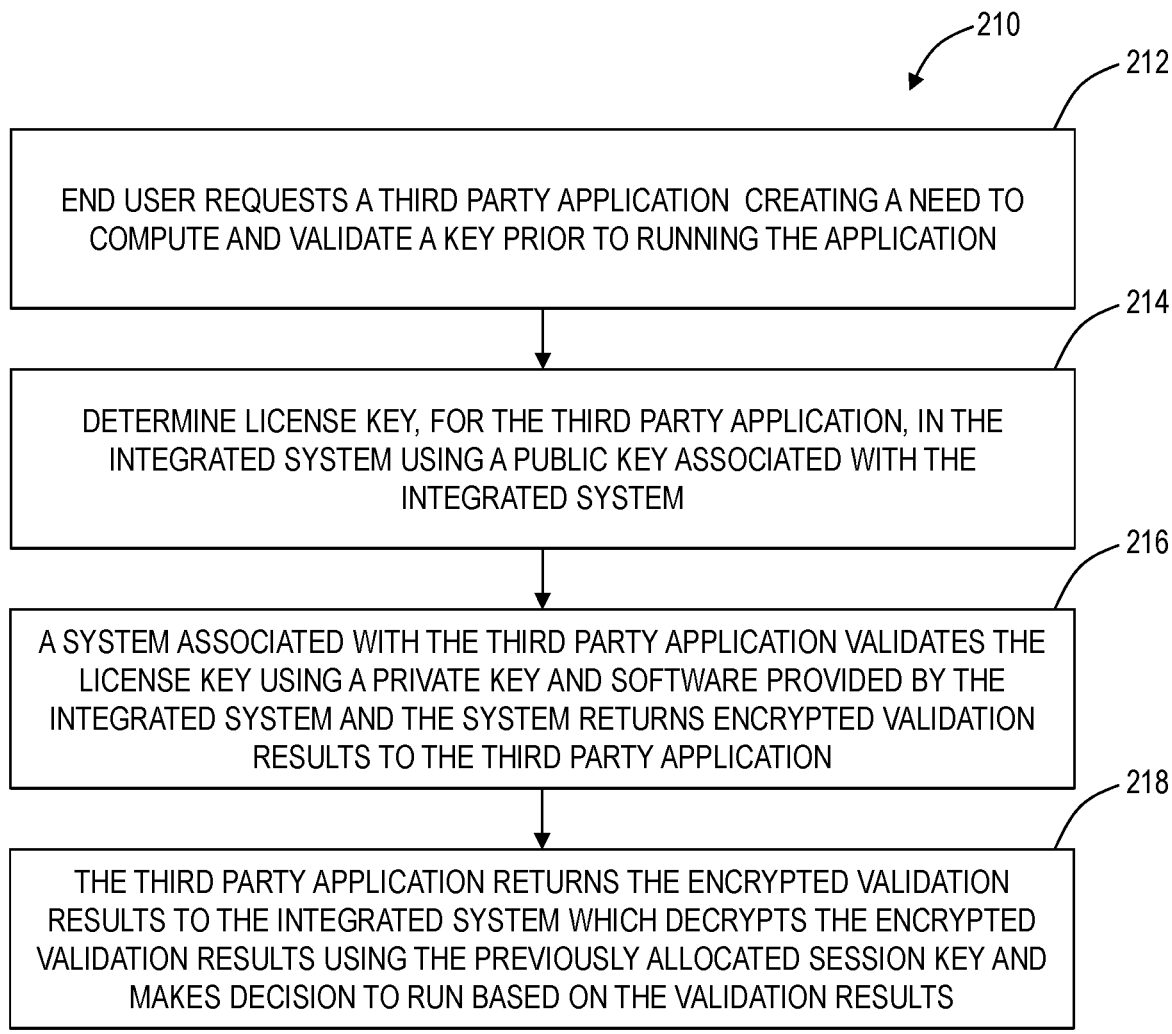
FIG. 13 is a flow chart of a dynamic licensing process in the operating environment.

Referring to FIG. 13, in an embodiment, a flow chart illustrates a dynamic licensing process 210 in the operating environment 200. The dynamic licensing process 210 includes an end user requesting a third-party application creating a need to compute and validate a key prior to running the application (step 212) and determining a license key, for the third-party application, in the integrated system using a public key associated with the integrated system (step 214). Next, a system associated with the third-party application validates the license key using a private key and software provided with the integrated system, and the system returns encrypted validation results to the third-party application (step 216). Finally, the third-party application returns the encrypted validation results to the integrated system which decrypts the encrypted validation results using the previously allocated session key and makes the decision to run based on the result (step 218).

In an embodiment, the dynamic licensing process 210 is implemented in an operating environment including one or more third-party applications, an integrated system offering and executing the one or more third-party applications, and one or more end users operating the one or more third-party applications through the integrated system. The dynamic licensing process 210 can include, responsive to an end user requesting a third-party application through the integrated system, determining a license key, for the third-party application, in the integrated system using a public key associated with the integrated system; receiving an encrypted validation result from a system associated with the third-party application that validates the license key using a private key and software provided by the integrated system, wherein the system returns the encrypted validation results to the third-party application which provides the encrypted validation results to the integrated system; and decrypting the encrypted validation results using previously allocated session keys and determining whether to run the third-party application based on the validation results.

The integrated system can offer the one or more third-party applications through a plugin framework adapted to auto-license and auto-configure the one or more third-party applications from different vendors. The dynamic licensing process 210 can include executing the third-party application via the integrated system based on the validation results. The dynamic licensing process 210 can include determining the fraudulent use of the third-party application via the integrated system based on the validation results. The one or more third-party applications can include Virtual Network Functions (VNF) that are executed by the integrated system as a cloud-based system. The one or more third-party applications can include Virtual Network Functions (VNF) that are not locked to a physical host. The integrated system can be adapted to generate dynamically the license key on-demand rather than obtaining the license key from the system associated with the third-party application. The one or more third-party applications can include at least two applications from different vendors, offered through the integrated system via a plugin framework. The integrated system can include a multi-domain orchestrator.

In another embodiment, an integrated system adapted to operate in an environment includes one or more third-party applications, the integrated system offering and executing the one or more third-party applications, and one or more end users operating the one or more third-party applications through the integrated system. The integrated system can include a network interface communicatively coupled to the one or more end users; a processor communicatively coupled to the network interface; and memory storing instructions that, when executed, cause the processor to, responsive to an end user requesting a third-party application through the integrated system, determine a license key, for the third-party application, using a public key associated with the integrated system; receive an encrypted validation result from a system associated with the third-party application that validates the license key using a private key and software provided by the integrated system, wherein the system returns the encrypted validation results to the third-party application which provides the encrypted validation results to the integrated system; and decrypt the encrypted validation results using previously allocated session keys to determine whether to run the third-party application based on the validation results.

The integrated system offers the one or more third-party applications through a plugin framework adapted to auto-license and auto-configure the one or more third-party applications from different vendors. The memory storing instructions that, when executed, can further cause the processor to execute the third-party application via the integrated system based on the validation results. The memory storing instructions that, when executed, can further cause the processor to determine the fraudulent use of the third-party application via the integrated system based on the validation results. The one or more third-party applications can include Virtual Network Functions (VNF) that are executed by the integrated system as a cloud-based system. The one or more third-party applications can include Virtual Network Functions (VNF) that are not locked to a physical host. The integrated system can be adapted to generate dynamically the license key on-demand rather than obtaining the license key from the system associated with the third-party application. The one or more third-party applications can include at least two applications from different vendors, offered through the integrated system via a plugin framework. The integrated system can include a multi-domain orchestrator.

Compatibility and Life Cycle Management

Figure 14:
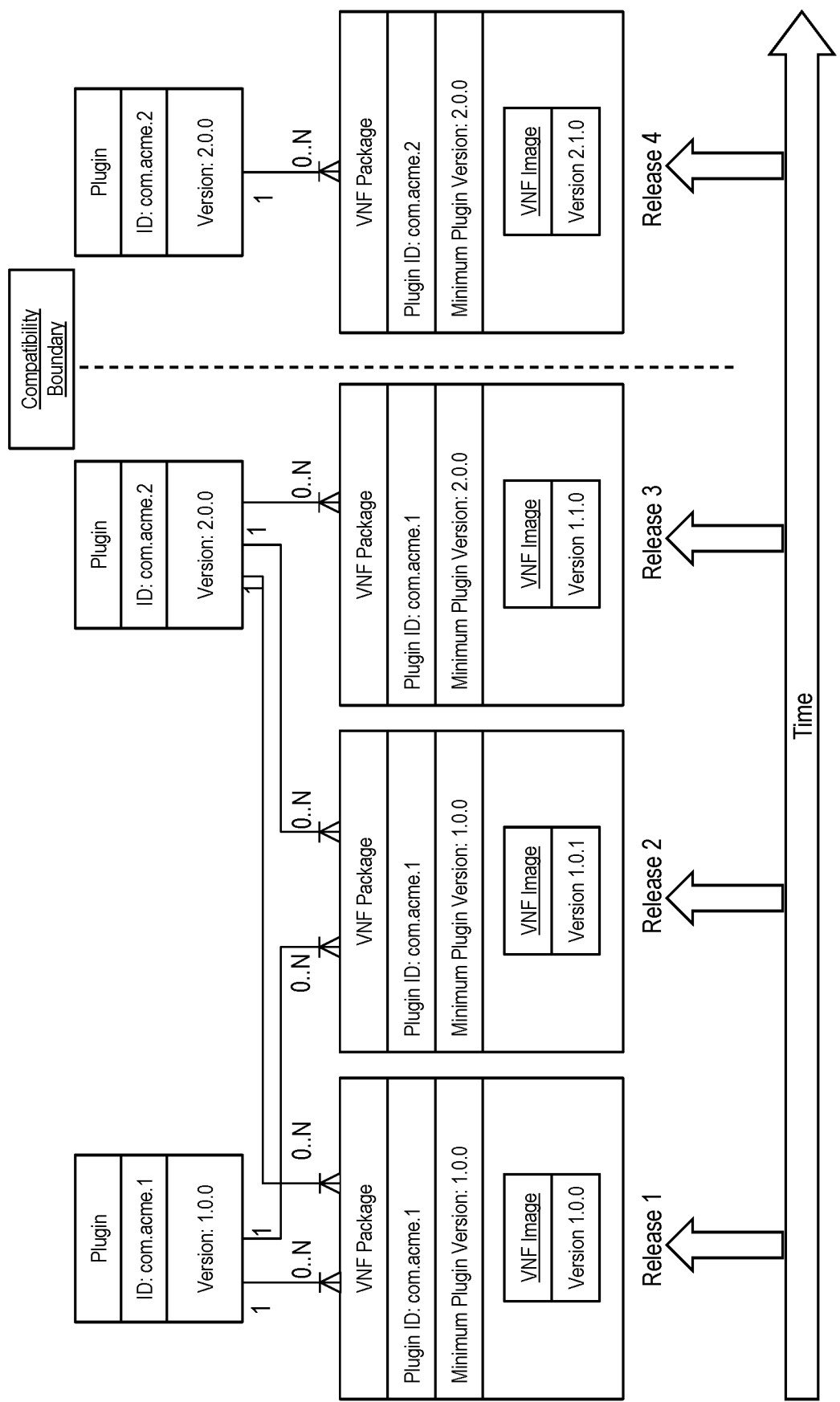
FIG. 14 is a diagram of typical VNF and/or plugin evolution.

To manage compatibility between the plugin framework and partner plugins, a version management scheme is defined. When updating either a plugin or a VNF, partners communicate the changes to the vendor of the integrated system and follow the rules for use of a version field. Partners control and manage compatibility between Plugins and Elements using their own compatibility rules. Having said that, consideration must be given to cloud NFV system requirements for plugin compatibility. More specifically, those requirements are: a cloud NFV system may simultaneously support multiple deployed instances of the same VNF with different versions. Due to OSGi container constraints, only one version of a plugin with a unique pluginID may be installed in the cloud NFV system at any given time. Thus, when a plugin update is introduced, and the plugin cannot support all prior versions of supported VNFs, a new plugin with a new pluginID need be created and installed. As an example, the evolution of a Partners VNF and associated plugins is shown in FIG. 14.

Plugins use a consistent version identification scheme. The version is defined within the OSGi Bundle-Version element of the plugin bundle manifest file when packaging a plugin into a bundle. It is mandatory that all plugins provide a meaningful version formatted as:

Major.Minor.Micro.Qualifier (e.g. 1.0.1.201501121900) where:
- Major is an integer value representing the major version of the plugin. Partners should increment this sub-field when significant new functionality is introduced in a Plugin update.
- Minor is an integer value representing the minor version of the plugin. Partners should increment this sub-field when minor new functionality is introduced in a Plugin update. The Minor field should be reset to zero any time the Major field is incremented.
- Micro is an integer value representing the micro version of the plugin. Partners should increment this sub-field when defects are addressed in a Plugin update. The Micro field should be reset to zero any time the Major or Minor field is incremented.
- Qualifier is a string identifying a specific plugin build. It is recommended this field encode the date/time of the build formatted as YYYYMMDDHHmm.

When looking up plugin services at runtime, the plugin framework enforces a plugin compatibility policy. The plugin framework validates the version of a plugin is greater than or equal to the Minimum Plugin Version from the VNF package prior to interacting with the plugin. All version subfields are considered during validation in order of precedence going from Major to Micro subfields. The Qualifier field is not considered during the validation.

Server

Figure 15:
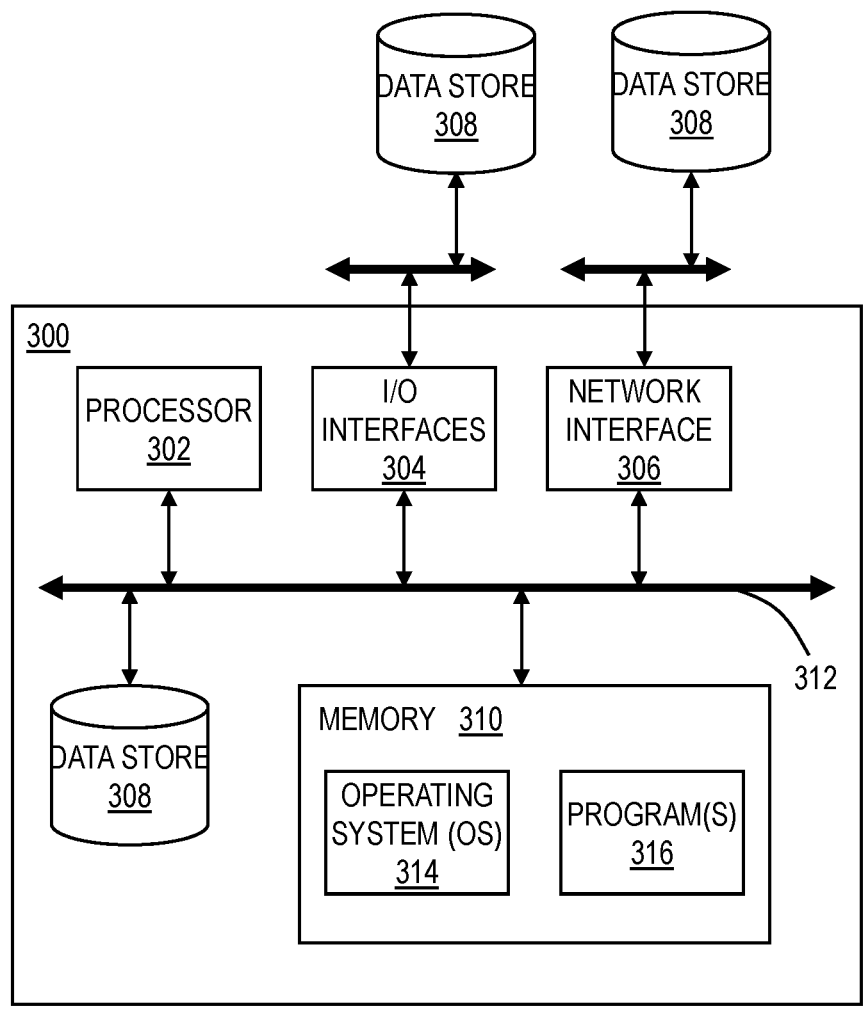
FIG. 15 is a block diagram illustrates a server, which can be used to realize various aspects of the dynamic licensing for applications and a plugin framework for virtual network systems.

Referring to FIG. 15, in an embodiment, a block diagram illustrates a server 300, which can be used to realize various aspects of the dynamic licensing for applications and a plugin framework for virtual network systems. In an embodiment, one or more servers 300 can form the integrated system 204, execute the one or more third-party applications 202, and execute applications for the end user 206. The server 300 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 15 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touchpad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network, such as the Internet, the WAN 404, the enterprise 200, and the like, etc. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally, in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs 316, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Operating Environment

Figure 16:
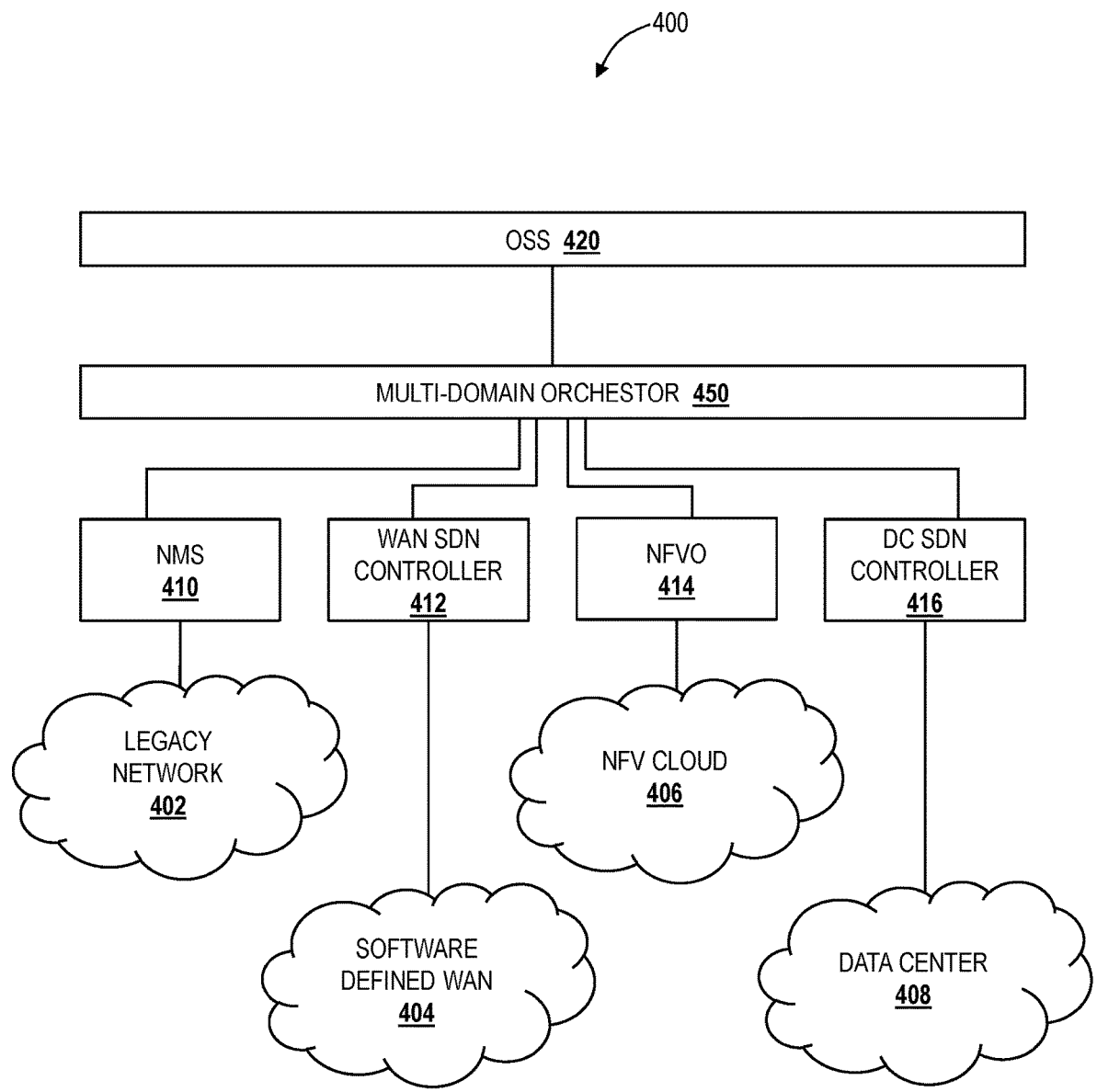
FIG. 16 is a network diagram of an operating environment for the modular plugin framework architecture and/or the dynamic licensing process.

Referring to FIG. 16 is a network diagram of an operating environment of a network 400 for the modular plugin framework architecture and/or the dynamic licensing process. The network 400 can include a legacy network 402, a software defined Wide Area Network (WAN) 404, an NFV cloud 406, a data center 408, and the like. A network operator's infrastructure includes multiple technology layers and specialized domains such as cloud, metro, access, and core networks, represented in FIG. 16 by the legacy network 402, the software defined Wide Area Network (WAN) 404, the NFV cloud 406, and the data center 408. Creating and deploying services from end-to-end in this environment is traditionally a manual intensive process that entails updating multiple vendor- and domain-specific element managers, such as a NMS 419, SDN controllers, or orchestrators, such as a WAN SDN controller 412, an NFV Orchestrator (NFVO) 414, and a Data Center (DC) SDN controller 416, etc., and then integrating these changes with a back-end Operational Support System (OSS) 420. Note, in various embodiments, the NMS 410, the SDN controllers 412, 416, and the NFVO 414 can be implemented by one or more servers 300.

In addition to being complex and error-prone, this service delivery model preserves the management 'silos' of the legacy era, making the transformation to SDN and NFV more complex and inefficient than necessary. The network 400 can include a multi-domain orchestrator 450 to support multi-domain orchestration capabilities, providing an open software layer that eliminates management silos and enables network operators to automate end-to-end service provisioning and orchestration. In an embodiment, the multi-domain orchestrator 450 can be the integrated system 204. Leveraging open APIs and model-driven templates, the multi-domain orchestrator 450 integrates with third-party SDN controllers, such as the SDN controllers 412, 416, element/network management systems, such as the NMS 410, and orchestration platforms, such as the NFVO 414, to manage and orchestrate services including physical and virtual resources across multiple technology and vendor domains.

The multi-domain orchestrator 450 can be a modular and programmable structure that supports control of multiple technologically diverse domains: cloud, multi-layer WAN, NFV, IP/MPLS, and more. The multi-domain orchestrator 450 can utilize Topology and Orchestration Specification for Cloud Applications (TOSCA)-based templates allowing for rapid network services programmability and self-service in operating the network 400. The multi-domain orchestrator 450 integrates with various SDN controllers, element/network management systems, and cloud management platforms; supports service chains including physical network elements and SDN/NFV-enabled virtual components across multiple domains; enables standardized and automated service delivery via repeatable, simplified, and auditable processes; enables delivery of compelling services such as NFV-enabled Ethernet Network-as-a-Service (NaaS); and breaks down management silos, allowing network operators to orchestrate services from end-to-end. The multi-domain orchestrator 450 streamlines the process associated with defining, creating and deploying innovative new services. By seamlessly provisioning and managing service chains including physical network elements and virtual components, the multi-domain orchestrator 450 provides more flexibility for network operators and their customers. Services can be deployed more quickly and changed in real-time rather than requiring complex, manual changes.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Network Functions Virtualization (NFV) method of integrating third-party Virtual Network Functions (VNF) through a plugin framework, the NFV method comprising:
   operating, via one or more servers in an NFV cloud, the plugin framework, wherein the plugin framework comprises Application Programming Interfaces (API) to one or more third-party VNFs;
   providing a catalog of VNF services comprising the one or more third-party VNFs to an end user;
   operating the one or more third-party VNFs via the NFV cloud; and
   enabling runtime code of a third-party vendor to implement features on the NFV cloud to detect and block unauthorized use of at least one of the one or more third-party VNFs,
   wherein the at least one of the one or more third-party VNFs is from the third-party vendor, and the third-party vendor is not an operator of the NFV cloud.

2. The NFV method of claim 1, wherein each of the one or more third-party VNFs is a plugin including an Open Service Gateway Initiative (OSGi) bundle which is executed atop a container.

3. The NFV method of claim 1, wherein the catalog of VNF services comprises a plurality of third-party VNFs including the one or more third-party VNFs, the plurality of third-party VNFs including at least two VNFs from different vendors.

4. The NFV method of claim 1, wherein the plugin framework comprises the APIs, a service mediation layer, and an element interface for management.

5. The NFV method of claim 1, wherein the catalog of VNF services further comprises one or more VNF services from the operator of the NFV cloud.

6. The NFV method of claim 1, further comprising:
licensing the one or more third-party VNFs to the end user via the NFV cloud, wherein none of the one or more third-party VNFs are from a vendor that is an operator of the NFV cloud.

7. The NFV method of claim 1, wherein the NFV cloud comprises components of an Open Service Gateway Initiative (OSGi) modular framework.

8. The NFV method of claim 1, further comprising:
onboarding the one or more third-party VNFs from one or more vendors to the NFV cloud.

9. A Network Functions Virtualization (NFV) cloud system configured to integrate third-party Virtual Network Functions (VNF) through a plugin framework, the NFV cloud system comprising:
a plurality of servers, each server comprising a processor, data store, memory, and interfaces, configured to operate the plugin framework, wherein the plugin framework comprises Application Programming Interfaces (API) to one or more third-party VNFs, provide a catalog of VNF services comprising the one or more third-party VNFs to an end user, operate the one or more third-party VNFs, and enable runtime code of a third-party vendor to implement features on the NFV cloud to detect and block unauthorized use of at least one of the one or more third-party VNFs,
wherein the at least one of the one or more third-party VNFs is from the third-party vendor, and the third-party vendor is not operator of the NFV cloud system.

10. The NFV cloud system of claim 9, wherein each of the one or more third-party VNFs is a plugin including an Open Service Gateway Initiative (OSGi) bundle which is executed atop a container.

11. The NFV cloud system of claim 9, wherein the catalog of VNF services comprises a plurality of third-party VNFs including the one or more third-party VNFs, the plurality of third-party VNFs including at least two VNFs from different vendors.

12. The NFV cloud system of claim 9, wherein the plugin framework comprises the APIs, a service mediation layer, and an element interface for management.

13. The NFV cloud system of claim 9, wherein the catalog of VNF services further comprises one or more VNF services from the operator of the NFV cloud.

14. The NFV cloud system of claim 9, wherein the one or more servers are further configured to license the one or more third-party VNFs to the end user via the NFV cloud system, wherein none of the one or more third-party VNFs are from a vendor that is an operator of the NFV cloud system.

15. The NFV cloud system of claim 9, wherein the NFV cloud system comprises components of an Open Service Gateway Initiative (OSGi) modular framework.

16. The NFV cloud system of claim 9, wherein the one or more servers are further configured to onboard the one or more third-party VNFs from one or more vendors to the NFV cloud system.

17. A non-transitory computer-readable medium comprising instructions for a Network Functions Virtualization (NFV) cloud system to integrate third-party Virtual Network Functions (VNF) through a plugin framework, the instructions cause one or more processors to perform the steps of:
operating the plugin framework, wherein the plugin framework comprises Application Programming Interfaces (API) to one or more third-party VNFs;
providing a catalog of VNF services comprising the one or more third-party VNFs to an end user;
operating the one or more third-party VNFs via the NFV cloud; and
enabling runtime code of a third-party vendor to implement features on the NFV cloud to detect and block unauthorized use of at least one of the one or more third-party VNFs,
wherein the at least one of the one or more third-party VNFs is from the third-party vendor, and the third-party vendor is not an operator of the NFV cloud.

18. The non-transitory computer-readable medium of claim 17, wherein the catalog of VNF services comprises a plurality of third-party VNFs including the one or more third-party VNFs, the plurality of third-party VNFs including at least two VNFs from different vendors.

19. The non-transitory computer-readable medium of claim 17, wherein the catalog of VNF services further comprises one or more VNF services from the operator of the NFV cloud.

20. The non-transitory computer-readable medium of claim 17, wherein the NFV cloud comprises components of an Open Service Gateway Initiative (OSGi) modular framework.

* * * * *